June 23, 1970   W. E. FOLKERTS   3,516,437
VALVE FOR AUTOMOBILE POWER STEERING GEAR
Filed May 17, 1968   3 Sheets-Sheet 1
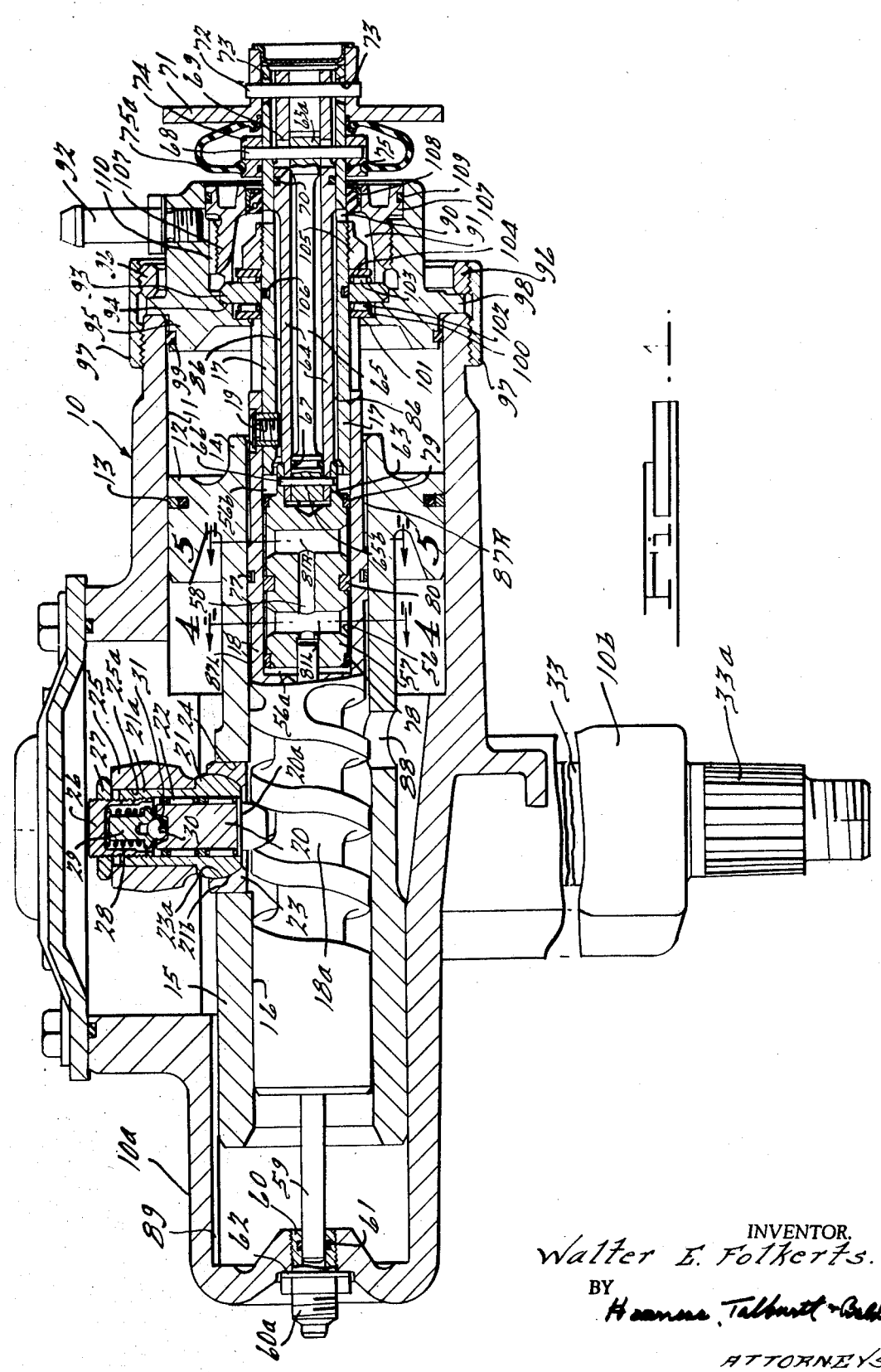
INVENTOR.
Walter E. Folkerts.
BY
Hauser, Talbutt + Belden
ATTORNEYS.

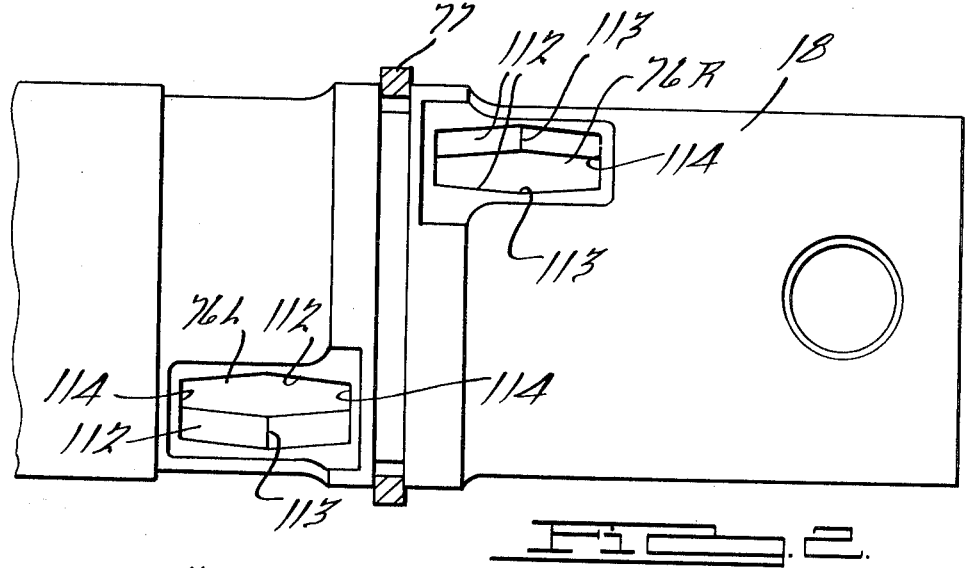
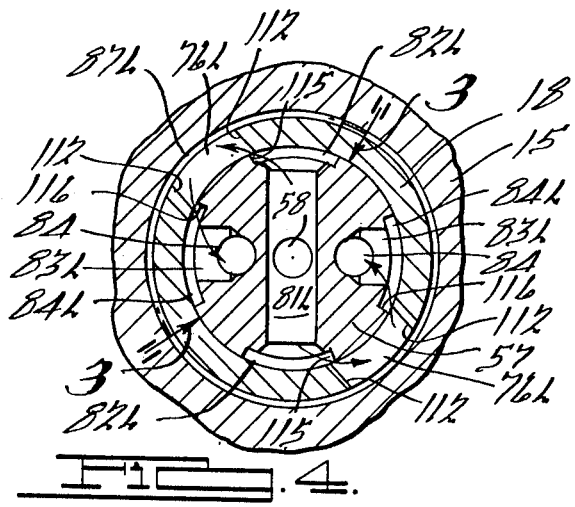
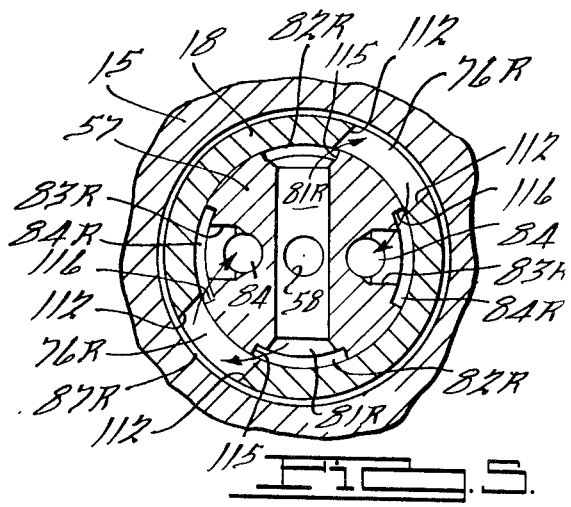
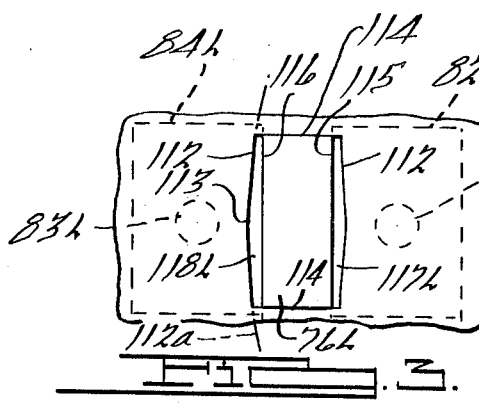
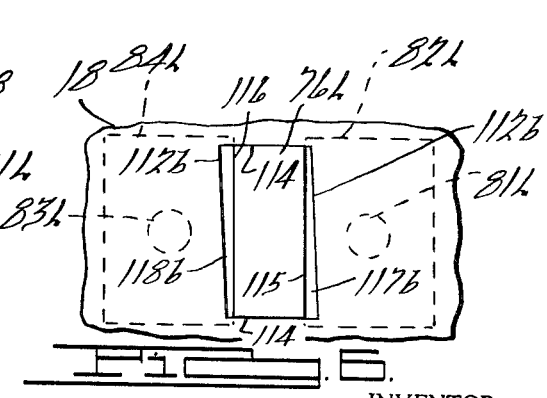

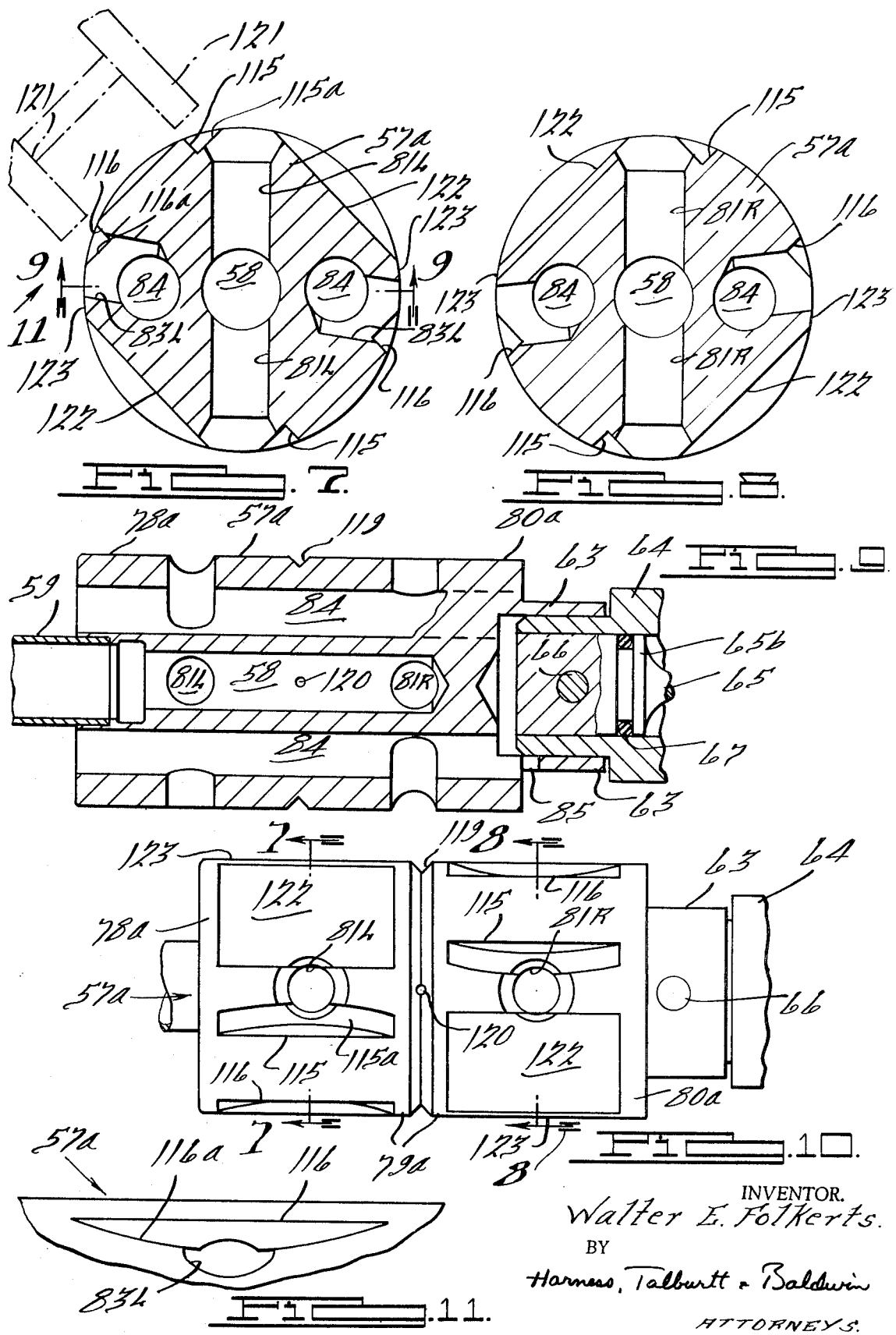

United States Patent Office 3,516,437
Patented June 23, 1970

3,516,437
VALVE FOR AUTOMOBILE POWER STEERING GEAR
Walter E. Folkerts, 22680 Oak Court,
Hazel Park, Mich. 48030
Continuation-in-part of application Ser. No. 516,990,
Dec. 28, 1965. This application May 17, 1968, Ser.
No. 730,149
Int. Cl. F16k *31/12, 11/00*
U.S. Cl. 137—596
17 Claims

ABSTRACT OF THE DISCLOSURE

Relatively rotatable coaxial inner and outer valve members have confronting outer and inner sealing surfaces respectively in sealing relationship. A pair of diametrically opposed workports extend radially completely through the walls of the outer member, each workport being associated with and partially overlapped by circumferentially spaced supply and return ports in the inner member to provide a pair of axially elongated supply and return passages having accurately defined circumferentially extending short ends spaced axially by accurately defined circumferentially spaced elongated porting edges. One porting edge of each passage is provided by the workport and is slightly oblique to the other porting edge of the same passage, whereas the porting edges provided by the associated supply and return ports are parallel to each other. Each supply and return port comprises a separate recess extending axially in the outer sealing surface between a pair of annular sealing lands provided by said outer sealing surface and having one edge defining the porting edge of that port. Each supply port also comprises a pressure balancing recess extending axially in said outer sealing surface between said annular sealing lands and terminating circumferentially away from the associated return port and short of the next adjacent return port to provide an axially extending sealing land spacing said latter port from the pressure balancing recess.

BACKGROUND AND SUMMARY OF THE INVENTION

This application is a continuation in part of my copending application Ser. No. 516,990, filed Dec. 28, 1965, now Patent 3,383,959.

This invention relates to improvements in an automobile power steering gear and in particular to a rotary valve for such a gear, wherein the valve is manually operable for selectively supplying pressurized fluid to a pressure actuated piston operatively connected with the dirigible wheels of the vehicle to steer the same.

Among the important considerations in the design of such a valve is the provision of nominal sensitivity within a short range of steering movement in either direction from a neutral or straight ahead position, while maintaining a high degree of sensitivity throughout the remaining steering movement, so that the latter is immediately responsive to manually actuated rotation of the valve. An accurate but reduced "feel" of the steering force in direct proportion to the road resistance is important to assure optimum steering control by the operator, and a comparatively low internal resistance or back pressure at the straight ahead condition is important to minimize heating of the pressurized fluid, thereby to prolong the life of the power steering pump and hose system. In addition, the steering gear including the valving must be compact, particularly in the axial dimension, in order to fit within the limited space available.

A typical valve construction of the above mentioned type known heretofore has comprised relatively rotatable coaxial inner and outer valve members having supply and inlet ports in one member substantially spaced circumferentially by a workport in the other member. The ports comprise bores of circular cross section in their respective members having edge portions at each of the the opposite sides of the work port overlapped by the adjacent supply and return ports to provide supply and return passages respectively for transmitting operating fluid to and from the pressure actuated piston. Upon relative rotation of the members in one direction, the overlap comprising the supply passage is increased and the overlap comprising the return passage is correspondingly decreased to effect a steering operation in one direction.

This type of valve is characterized by objectionable high back pressure at the neutral straight ahead steering position. When it is attempted to reduce the back pressure by increasing the aforesaid overlap effecting the supply and return passages, the sensitivity of the valve to steering movement is unacceptably impaired. Efforts have been made to maintain sensitivity by providing a number of axially parallel sets of the circular work ports partially overlapped by the circular supply and return ports, but such a structure increases the axial length of the valve to an unacceptable extent. Furthermore, it has been prohibitively costly to provide a plurality of sets of ports within operating tolerances. In this regard it has been sufficiently difficult to maintain tolerances on one set of ports, without geometrically complicating the problem with a multitude of such sets.

An object of the present invention has been to provide an improved rotary power steering valve of the above general character which avoids the above mentioned problems and achieves all the advantages of such valves known heretofore and enables a compact valve which can be conveniently and economically fabricated.

Another object is to provide such a valve which is adequately sensitive to steering movement, yet avoids an excessive back pressure and consequent overheating of the pressurized fluid and enables the operator to sense or "feel" the road reaction adequately for optimum steering control.

Another object is to provide a smoothly operating and comparatively noise-free valve of the above mentioned type that effects gradual closing of the supply and return passages during operation so as to avoid sudden changes in fluid pressure and operating characteristics of the steering gear.

Another object is to provide such a valve which is universally adaptable for use with automobiles ranging in size from the comparatively lightweight Valiant to the comparatively heavy Chrysler without changes in dimensions, merely by adjusting the usual pressure relief valve which determines the maximum operating pressure during a steering movement.

Other objects of this invention will appear in the following description and appended claims, reference being had to the accompanying drawings forming a part of this specification wherein like reference characters designate corresponding parts in the several views.

FIG. 1 is a cross sectional view of a steering gear embodying the present invention, taken generally along the axis of the driven shaft and worm gear and showing the rotary valve in the neutral or straight ahead position.

FIG. 2 is an enlarged and partially schematic plan view of the integral worm and valve sleeve member.

FIG. 3 is a partially schematic fragmentary view along the circumference of the sleeve valve of FIG. 2, taken in the direction of the arrows substantially along the arcuate line 3—3 of FIG. 4.

FIG. 4 is a transverse sectional view through the valve, taken in the direction of the arrows substantially along the line 4—4 of FIG. 1.

FIG. 5 is a transverse sectional view through the valve, taken in the direction of the arrows substantially along the line 5—5 of FIG. 1.

FIG. 6 is a view similar to FIG. 3, showing a modification of the work port.

FIGS. 7 and 8 are transverse sectional views similar to FIGS. 4 and 5 showing a modification of the valve spool and taken in the direction of the arrows 7—7 and 8—8 respectively of FIG. 10, but rotated 90°.

FIG. 9 is a longitudinal mid-sectional view of the modified valve assembly of FIGS. 7 and 8 taken in the direction of the arrows substantially along the line 9—9 of FIG. 7.

FIG. 10 is a plan view of the valve assembly of FIGS. 7 and 8.

FIG. 11 is a fragmentary elevational view of the valve as seen in FIG. 7, taken in the direction of the arrow 11 of FIG. 7.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a particular embodiment of the present invention is illustrated by way of example in a hydraulically actuated steering gear for an automobile comprising a housing 10 having a cylindrical bore 11 in which a fluid pressure actuated piston 12 is reciprocable. An annular seal 13 around the periphery of the piston 12 cooperates with the latter to partition the bore 11 into left and right parts. The piston 12 is provided with integral tubular coaxial sleeves or guide extensions 14 and 15 extending to the right and left respectively and cooperating to effect a bore 16 extending axially through the entire piston structure. The left extension 15 slides axially in guided relation within a cylindrical extension 10a of the housing 10.

A two part tubular driven shaft is rotatably supported within the bore 16 and comprises an outer shaft 18 and a coaxial inner shaft 17 snugly interfitting to complete a fluid tight seal therebetween and securely keyed together by a pin 19 for rotation as a unit. The left end of shaft 18 comprises an integral worm gear 18a which may have a variable or constant pitch and which is engaged by a rotatable follower pin 20 having a tapered nose adapted to ride along the spiral groove of the worm 18a upon rotation of the latter. The follower 20 is journaled in a bell element 21 by means of needle bearings 22 which seat against an annular flange 20a of the follower 20 immediately above the latter's nose. The ball element 21 has a stem 21a coaxial with the axis of rotation of the pin 20, and an integral spherical ball portion 21b seated in a mating spherical socket 23a of an annular socket element 23. The latter is carried by and fixed with respect to the extension 15 by being pressed tightly into an annular embossment 24 integral with shaft extension 15. The follower 20 extends through the center of ball 21b and into the spiral groove of worm 18a.

The stem 21a extends tightly into a bore 25a in the swinging end of a crank arm 25 which is secured firmly against the enlargement of ball 21b by means of a nut 27 screwed tightly on a hollow cap screw 26 and against arm 25. The screw 26 screws into the internally threaded outer end of stem 21a and provides a seat for a coil spring 28 compressed axially of the follower 20 against an annular shoulder of a pilot 29. The inner end of the pilot 29 provides a spherical socket for an anti-friction ball 30, which in turn seats within an outwardly opening depression 31 in the outer end of follower 20, whereby the latter is urged in the direction of its axis into engagement with the groove of worm 18a. The needle bearings 22 are retained in an annular bearing race confined between the lower or inner end of cap screw 26 and the enlargement 20a.

The swinging arm 25 extends perpendicularly from the axis of the worm 18a to the rock shaft 33 when the steering mechanism is in the straight ahead steering position illustrated in FIG. 1 and is preferably formed integrally with the rock shaft 33. The latter is pivotal about an axis transverse to the axis of the worm and is suitably journaled in a housing extension 10b. The left end of rock shaft 33 comprises a tapered spline 33a adapted to be connected with the customary linkage for steering the vehicle ground engaging wheels. Reference may be had to my aforesaid copending application, as if the same were embodied herein, for details of the structure described thus far.

Rightward of the worm 18a, the bore of the integral tubular shaft 18 enlarges at 56 to provide a coaxial enclosure for a hollow cylindrical valve spool 57 having an inner chamber 58 closed at its right end and opening leftwardly to communicate with a source of pressurized fluid by means of a supply conduit 59 which extends axially through the worm 18a and into the left end of the valve spool 57. The conduit 59 passes freely through the bore of the worm 18a so as to rotate independently thereof and is pressed tightly into fluid sealing engagement into the left end of valve spool 57 to rotate as a unit therewith. The left end of conduit 59 extends rotatably into the right end of a tubular fitting 60 screwed into the housing extension 10a and adapted externally at 60a for connection with a source of pressurized fluid, as for example the outlet of a power steering pump. Annular seals 61 and 62 around the conduit 59 and fitting 60 prevent axial endwise leakage of pressurized fluid from the housing extension 10a.

The right end of chamber 58 is closed by an integral end portion of spool 57 which in turn has a rightwardly opening socket portion 63 of reduced external diameter connected by means of a diametric pin 66, FIGS. 1 and 9, to the left end of a tubular valve actuator or driving shaft 64 and the enlarged left end 65b of a coaxial inner torsion rod 64 for rotation as a unit therewith. A suitable annular seal 67 around the enlargement 65b prevents axial leakage of hydraulic fluid from the bore of shaft 17 and return conduits 84 (described below) into the bore of the tubular driving shaft 64.

The torsion rod 65 extends coaxially within the valve actuator or driving shaft 64 and terminates in an enlarged end 65a keyed to the outer driven shaft 17 by means of a pin 68. The latter extends through diametrically spaced and circumferentially extending lost motion slots 69 in the driving shaft 64, which allow approximately 8° of rotation of the driving shaft 64 in either direction from a neutral straight ahead steering position before the driving shaft 64 engages the pin 68. A suitable annular seal 70 around the driving shaft 64 prevents axial end-wise leakage of hydraulic fluid between the latter and shaft 17.

The driving shaft 64 is operably connected to the customary manually actuated steering wheel of the automobile by means of a steering shaft and universal coupling including a hub member 71 and diametrical pin 72 as part thereof. The latter extends through hub 71 and the right end of driving shaft 64 to key these together for rotation as a unit. Similarly to the lost motion slots 69, diametrically spaced lost motion slots 73 are provided in the right end of driven shaft 17 for passage of the pin 72, so that upon rotation of the latter about the common axis of the shafts 17 and 64, the shaft 64 will rotate approximately 8° from the neutral position before the pin 72 engages the driven shaft 17. Thus the pin 72 comprises the main manual driving connection between the automobile steering wheel and driven shaft 17 in the event of hydraulic power failure. The opposite ends of pin 68 extend radially through a valve adjustment ring 74. The latter is covered by a flexible dirt shield 75a clamped to shaft 17 by hub 71 and cooperable with an annular seal 75 between shaft 17 and ring 74 to shield the adjustment mechanism of ring 74 from dirt.

In operation of the device described thus far, upon rotation of the manual steering wheel so as to rotate pin 72 and in turn rotate shaft 64 about its longitudinal axis, the rotation of shaft 64 will be imparted directly to the valve spool 57 to rotate the latter and thereby to direct pressurized fluid either to the left or right side of piston 12 as described below so as to reciprocate the piston 12 and rotate worm 18a and rock shaft 33 in the direction to effect the desired turn. Rotation of the driving shaft 64 will be yieldingly resisted by the torsion rod 65 connected at its right end to the driven shaft 17 by pin 68. This resistance will be determined by the road reaction on the dirigible wheels of the vehicle which resists turning of the rock shaft 33 and thereby resists rotation of worm 18a and shaft 17. In the event of hydraulic power failure, torsion rod 65 will either cause rotation of the driven shaft 17 directly if the road reaction is comparatively light, as for example during high speed driving, or the left end of torsion rod 65 will rotate with driving shaft 64 approximately 8° with respect to the driven shaft 17, in which event pin 72 will engage driven shaft 17 to rotate the latter and worm 18a to effect manual steering.

In order to effect hydraulic power steering, the shaft 18 is provided with a pair of diametrically aligned work ports or openings 76L and a similar pair of diametrically aligned work ports 76R at the region of the valve spool 57. The ports 76L are spaced axially from the ports 76R by an annular seal 77 between the circumference of shaft 18 and the interior of sleeve 15 to cooperate with piston 12 in partitioning the cylinder 11 into the aforesaid left and right parts. An annular sealing land 78 is provided around the periphery of valve 57 adjacent its left edge in FIG. 1 to engage the interior of bore 56 and prevent leakage of pressurized fluid into the valve porting system described below. Similar lands 79 and 80 are provided at the right edge and center respectively, of valve 57, the land 80 spacing the ports 76L and 75R and being formed in two halves to facilitate assembly on the valve 57, whereas the lands 78 and 79 are annular and are pressed onto the ends of valve 57.

Communicating with the chamber 58 and extending diametrically through the circumferential sidewall of the valve 57 at the regions of the work openings 76L and 76R respectively are two axially spaced supply ports 81L and 81R, which terminate in radially outwardly opening enlargements 82L and 82R, respectively, FIGS. 4 and 5. Associated respectively with the supply ports 81L and 81R are paired return ports 83L and paired return ports 83R extending radially into the outer surface of the inner valve member 57 at locations spaced 90° circumferentially from the associated supply ports. The return ports 83L and 83R open radially outwardly at enlargements 84L and 84R respectively, FIGS. 4 and 5, and communicate with a pair of axially extending return conduits 84 in the inner valve 57, which open axially into the space 56a between the left end of valve 57 and the shoulder at the base of the bore enlargement 56 to drain fluid therefrom, and also open at the right end of valve 57 through a corresponding pair of radially opening ports 85, FIG. 9, defined by the axial extension of the conduits 84 partially into the reduced diameter socket 63. The ports 85 open into the space 56b within bore enlargement 56 at the right end of valve 57, which space communicates with an annular fluid return conduit 86 comprising the space between valve driving shaft 64 and driven shaft 17.

Each port 76L is associated with a supply port 81L and a return port 83L, and is arranged between these associated ports when the valve is at its neutral position shown, FIGS. 4 and 5. Similarly each work port 76R is associated with a supply port 81R and a return port 83R and is arranged between these associated ports when the valve is at the neutral position. Also when the valve spool 57 is in the neutral position, each work port 76 (L or R) is in partial communication with both its associated supply port 81 (L or R) and return port 83 (L or R), so that pressurized fluid entering the chamber 58 from conduit 59 will be discharged through the supply ports 81L and 81R into the associated work ports 76L and 76R and thence into the associated return ports 83L and 83R to the axial return ducts 84.

The work ports 76L and 76R are offset approximately 90° from each other so that rotation of the valve member 57 counterclockwise in FIGS. 4 and 5 will close the communication between the supply ports 81R and work ports 76R, and open the communication between the work ports 76R and return ports 83R. Similarly the communication between supply ports 81L and work ports 76L will be increased and the communication between work ports 76L and return ports 83L will be closed. Pressurized fluid will thus be discharged through work ports 76L into the annular flow passage 87L at the left of the seal 77 between supporting sleeve 15 and shaft 18, and thence along worm 18a and through port 88 in sleeve 15 to the left side of piston 12 in cylinder 11 to drive the same from left to right, rotate worm 18a counterclockwise as viewed from the right in FIG. 1, and swing follower 20, crank arm 25 and rock shaft 33 to effect a left turn for the vehicle. Pressurized fluid at the right side of the piston 12 will be returned as described below to the work openings 76R and discharged via return ports 83R to return conduits 84.

It is apparent from the foregoing that upon clockwise rotation of valve member 57 with respect to worm shaft 18 in FIGS. 4 and 5, the pressurized fluid will be supplied through ports 81R to openings 76R and thence to annular conduit 87R at the right of seal 77 between sleeve 15 and shaft 18 and to the right side of piston 12 in cylinder 11 to drive piston 12 from right to left and effect a right-hand turn for the vehicle. In this event, the return fluid will be discharged from the left side of piston 12 into work opening 76L and thence through ports 83L to return ducts 84 via port 88 and conduit 87L. The return flow from the right side of piston 12 when the left side of the latter is pressurized will be the reverse of the flow path described above to pressurize the right side of piston 12. Fluid from within the main body of housing 10 is also conducted freely to the left end of housing portion 10a by means of conduit 89 to prevent any dash-pot action.

The annular return conduit 86 extends axially within the bore of shaft 17 to a plurality of radial ports 90 in the latter. The ports 90 communicate radially outwardly of the shaft 17 with an annular space or chamber 91 around shaft 17 and thence with a return connection 92 adapted to be connected with a reservoir or with the inlet side of the power steering pump.

The driven shaft assembly 17, 18 is held in axial position with respect to the housing 10 by means of an annular stop or bearing race 93 abutting an annular shoulder 94 of an end closure 95 for cylinder 11 and secured in position by a nut 96 screwed into the right end of a sleeve nut 97 against a radial flange 98 integral with closure 95 and seated against the right end of housing 10, FIG. 1. The sleeve 97 is also screwed on an externally threaded portion of housing 10 and cooperates with nut 96 in mutually interlocking relation. A suitable annular seal 99 around closure 95 prevents loss of fluid axially from cylinder 11. An annular needle bearing race 100 coaxially around shaft 17 abuts a radial shoulder 101 of closure 95 and is spaced from race 93 by a needle bearing set 102. A similar annular needle bearing set 103 around the shaft 17 spaces the race 93 from a third annular bearing race 104 maintained in axial position by a nut 105 screwed on an externally threaded portion of shaft 17 near its right end. An annular seal 106 around shaft 17 at the inner periphery of the race 93 prevents axial endwise leakage from cylinder 11 along shaft 17. In this regard the outer periphery of race 93 seats in fluid sealing engagement against a mating annular wall of closure 95 to complete the seal for the right end of cylinder 11. The space 91 at the right of the ports 90 is closed by a nut 107 which screws into the annular opening of closure 95 around shaft 17 and carries inner and outer annular seals 108 and 109 in sealing engagement with the outer periphery of shaft 17 and inner periphery of closure 95. An axial groove 110 in the inner periphery of closure 95 at the region of nut 107 provides communication between chamber 91 and the return connection 92.

Referring to FIGS. 2 through 5, the work ports 76L and 76R are somewhat elongated axially and diamond shaped, the elongated edges 112 of each work port comprising accurately defined porting edges which diverge from each other to central apices 113. The porting edges 112 terminate axially at accurately defined circumferentially extending ends 114 of the work ports. Each work port 76L or R also extends radially completely through the annular wall of the outer driven shaft 18 and is preferably formed by a broaching operation, so that all of the radially extending wall elements of the edges 112 and ends 114 are parallel to each other.

The supply port 82L or R and return port 84L or R associated with each diamond-shaped work port 76L or R are accurately defined in part by parallel proximate porting edges 115 and 116 respectively. Thus as illustrated in FIG. 3, the circumferentially spaced edge portions of each work port 76L at the neutral or straight ahead steering position are overlapped several thousandths of an inch by the proximate edge portions of the associated supply port 82L and return port 84L to provide an axially elongated fluid supply passage or slit 117L, accurately defined by the proximate edges 112 and 115, and an axially elongated fluid return passage or slit 118L accurately defined by the proximate edges 112 and 116. The supply and return ports 82L and 84L extend axially beyond the edges 114, so that the latter accurately define the ends of the slits or passages 117L and 118L. The relationships of FIG. 3 with respect to the ports 76L, 82L and 84L also apply in regard to the ports 76R, 82R and 84R, so that the latter are not described in detail.

Upon counterclockwise rotation of the inner spool valve member 57 in FIG. 4, i.e., to effect leftward movement of the porting edges 115 and 116 in FIG. 3 with respect to the porting edges 112, the area of the elongated supply passages 117L will increase and the area of the elongated return passages 118L will decrease. Correspondingly, the area of the elongated supply passages associated with the work ports 76R, FIG. 5, will decrease and the area of the elongated return passages associated with the work ports 76R will increase. The supply of pressurized fluid to the left side of piston 12 will be increased and the fluid at the right side of piston 12 will be returned to exhaust, as aforesaid, to effect a left turn.

During counterclockwise movement of the inner valve member 57 from the neutral position for a first distance until porting edge 116 intersects the porting edge 112, the area of supply passage 117L will increase at a constant rate with respect to the rate of rotational movement and at the same rate that the area of return passage 118L decreases. Thereafter, upon continued counterclockwise rotation of valve 57 for a second distance, the aforesaid rate of area increase for supply passage 117L will remain constant, but the aforesaid rate of area decrease for passage 118L will decelerate as the area of passage 118L decreases, until this area is reduced to zero by leftward movement of porting edge 116 to the proximate apex 113. Accordingly an abrupt closing (or an abrupt opening during the reverse movement) of return passage 118L in communication with the left side of piston 12 is avoided.

The elongated supply passage associated with each work port 76R and supplying pressurized fluid to the right side of piston 12 will also close (or open) at the same rate and simultaneously with the closing (or opening) of passage 118L, so as to avoid any abrupt discontinuity in the fluid pressure system.

It has been found that the dimensional relationships in the elongated supply and return passage are very critical and the drawings in this regard are schematic for the purpose of illustration only. Actually in order to obtain the proper low back pressure at the neutral position, and yet to effect the desired responsiveness to steering movement and to completely shut off one passage or the other, depending upon the direction of the turn, within the desired angular movement of the manually operated steering wheel, the axial elongation of each passage 117L and 118L with respect to its maximum circumferential width at the neutral position is on the order of and preferably greater than 25:1. The extent of rotational movement from the neutral position to the point at which either porting edge 115 or 116 first intersects the proximate oblique porting edge 112 is approximately one-fifth of the total rotational movement from the neutral position to the position at which the porting edge 115 or 116 intersects the proximate apex 113.

If the axial length between the end walls 114 is decreased, the back pressure increases. A $\frac{5}{8}''$ axial length approaches the lower limit and a $\frac{1}{2}''$ axial length is too short for a practical valve of the type shown because the back pressure and fluid heating at the straight ahead position become excessive. If the axial length is increased to $\frac{3}{4}''$, the valve becomes too insensitive and the back pressure is reduced to values lower than necessary to avoid overheating. Similarly, if the circumferential dimension which determines the aforesaid first distance of constant rate of area change for the supply and inlet slits is reduced, excessive overheating results. If it's increased, the valve sensitivity is sacrificed. Decreasing the circumferential dimension, which determines the aforesaid second distance of decelerating rate of decreasing area, rapidly increases the back pressure, whereas the valve rapidly becomes too insensitive if this dimension is increased. In general, the road "feel" experienced by the operator and effected by the torsion rod 65 varies inversely with the valve sensitivity and is adequate within the preferred dimensions. Similar remarks apply to the passages 118L, 117R and 118R which have the same dimensions as passage 117L.

Although the dimensional relationships of the above described supply and return passages are critical in order to maintain proper sensitivity, "feel" and back pressure at the straight ahead steering condition, these dimensions are substantially independent of the power requirements for high torque steering, as for example during a parking maneuver. Accordingly the same valve, dimensioned as above, may be employed with various automobile body sizes ranging from the comparatively lightweight Valient style body to the comparatively heavy Chrysler style body. This results in part because at the straight ahead steering position, the steering load is comparatively light and the same volume of fluid flow passes through the valve at the same back pressure for all body styles. It is thus only necessary to adjust the usual maximum pressure relief valve to effect a higher maximum operating pressure under high steering load conditions. With a $1''$ diameter valve 57 as shown and with a regulated rate of flow of pressurized fluid at approximately 2 gallons per minute, the above described valve 18, 57 may be adapted to operate during parking at between 700 and 800 p.s.i. for a Valiant and to between 1150 and 1250 p.s.i. for a heavier Chrysler, or at any intermediate pressure for intermediate size cars. The higher operating pressures will of course increase the frictional heating of the pressurized fluid, but such higher operating pressures will be of comparatively short duration and the total heating will not be objectionable.

As indicated in FIG. 3, instead of comprising two straight lines meeting at an apex 113, each porting edge 112 may comprise an arc 112a of large radius which conforms closely to the edge 112 and intersects the end walls 114 and the apex 113 at substantially the corresponding points defined by the edge 112. In any event the edges 112 or 112a are formed obliquely to the proximate edges 115 and 116, as well as to each other in the preferred construction shown, and are preferably formed by a broaching tool passing diametrically through the annular wall of the outer valve sleeve member 18. By forming the two diametrically spaced work ports 76L in the same broaching operation, accurate alignment with respect to each other is assured. The parallel edges 115 and 116 comprise the edges of recesses in the inner valve member 57 and are readily formed by milling operations. Similar remarks apply to the ports 76R, 82R and 84R.

FIG. 6 illustrates a work port 76L having porting edges 112b parallel to each, but oblique to the porting edges 115 and 116. In this case, the elongated supply and return passages 117b and 118b will have the same area for fluid flow at the neutral or straight ahead position shown as do the passages 117L and 118L of FIG. 3, provided that the shorter circumferentially extending end of each passage 117b or 118b has the same length as the corresponding end of passage 117L or 118L and the longer circumferentially extending end of each passage 117b or 118b was the same length as the distance from each porting edge 115 or 116 to the proximate apex 113.

Although the areas of the elongated passages in FIG. 6 are the same as in FIG. 3 at the neutral position shown, and the overall relative rotational movement of the inner and outer valve members would be the same to completely close one passage or the other, the valve of FIG. 6 would not be used under ordinary circumstances because the angle of obliqueness of the edges 112b with respect to the edges 115 and 116 is less than the corresponding angle in FIG. 3. In consequence the back pressure of the valve in FIG. 6 is unnecessarily high, as compared to the back pressure obtainable with the FIG. 3 valve. In order to obtain the same back presure in the FIG. 6 valve, the passages 117b and 118b must be elongated slightly in the axial dimension. The increased elongation decreases the sensitivity of the valve, as well as increases its overall axial length. Both results would be objectionable. Although the FIG. 6 valve is one that could be used if there were no better valve, it is described primarily to illustrate the critical nature of the valve and the dimensional relationships of FIG. 3.

FIG. 7 to 11 illustrate a preferred unitary inner spool valve 57a having integral lands 78a, 79a and 80a replacing the separately formed lands 78, 79 and 80 of the FIG. 1 valve 57. The central land 79a is partitioned by a pressure equalizing groove 119 extending within the outer sealing surface of the inner valve member 57a completely around the latter's circumference and connected with the high pressure chamber 58 by a radial duct 120 to apply high pressure fluid against the inner sealing surface of the outer valve sleeve member 18, thereby to prevent out-of-round deformation of the latter and binding of the valve members. In other respects the valve 57a is comparable to the spool valve 57 described above.

The pair of porting edges 115 and 116 associated with each work port 76L or R are preferably formed simultaneously by names of a rotary gang cutter having a pair of cutters 121, phantom view FIG. 7, rotatable about a common axis and precisely spaced circumferentially of the inner valve member 57a so as to cut arcuate notches 115a and 116a into the outer sealing surface of the valve member 57a and form the parallel porting edges 115 and 116. The notches 115a and 116a intersect the outer openings of the respective supply ports 81L or R and return ports 83L or R and extend circumferentially between the sealing lands 78a, 79a and 79a, 80a as the case might be, FIG. 10. Thus the paired associated edges 115 and 116 are formed accurately to maintain the desired circumferential spatial relationships with respect to each other and to the work ports 76L or R described above in regard to FIG. 3.

Only the circumferential region between the paired or associated porting edges 115 and 116 is critical to the control of the fluid pressure during steering. The major portion of the outer sealing surface of valve 57a clockwise from the supply ports 81L in FIG. 7, and counterclockwise in FIG. 8, to adjacent the next successive return port 83L or R is recesed to provide a pressure balancing flat 122 which intersects the proximate supply port 81L or R to receive pressurized fluid therefrom and terminates short of the adjacent return port 83L or R to provide an axial sealing land 123 bridging the paired circumferential sealing lands 78a, 79a, or 79a, 80a, as the case might be. Two pairs of diametrically opposed flats 122 are thus provided which extend axially between the paired lands 78a, 79a and 79a, 80a and assist in maintaining the coaxial relationship of the inner and outer valve members and in maintaining the circular cross sectional shape of the outer member to prevent binding of the valve. The notches 115a and flats 122 intersecting the supply ports 81L or R in FIGS. 7–11 provide enlarged openings for the latter ports and are thus comparable to the port enlargements 82L or R of FIGS. 4 and 5. Similarly the notches 116a intersecting the return ports 83L in FIGS. 7–11 are comparable to the enlarged port openings 84L or R of FIGS. 4 and 5.

I claim:
1. In a valve for supplying pressurized fluid to the fluid motor of an automobile power steering gear,
(A) a pair of valve members
 (a) movable relative to each other in a valve opening direction or the opposite from a neutral position and
 (b) having confronting sealing surfaces juxtaposed to restrict the flow of fluid therebetween,
(B) work port means comprising at least one work port opening into the sealing surface of one of said members,
(C) supply port means and return port means comprising a separate supply port and return port respectively associated with each work port and opening into the sealing surface of the other of said members at locations spaced in said direction by at least a portion of the associated work port,
 (a) each work port and associated supply port at said neutral position having supply edge portions overlapping to provide a fluid supply slit appreciably elongated transversely of said direction and defined at its elongated edges by paired proximate edges of said work port and associated supply port movable to increase or decrease the area of overlap upon relative movement of said members in said direction or the opposite respectively,
 (b) each work port and associated return port at said neutral position having return edge portions overlapping to provide a fluid return slit appreciably elongated transversely of said direction and defined at its elongated edges by paired proximate edges of said work port and associated return port movable to decrease or increase the corresponding area of overlap upon relative movement of said members in said direction or the opposite respectively,
(D) the short ends of each elongated slit defined by said overlapping edges at said neutral position extending generally in the direction of relative movement to effect a substantially constant rate of change of area for that slit upon said relative movement from said neutral position throughout a first distance amounting to the length of said short ends, and

(E) said proximate edges of each pair defining the elongated edges of each slit extending slightly obliquely to each other to decelerate the rate of decreasing area for that slit with respect to said relative movement throughout a second distance measured from said first distance in the direction of decreasing overlap.

2. In a valve according to claim 1, said first distance being less than said second distance.

3. In the combination according to claim 1, the proximate edges in one of said members being parallel to each other, each proximate edge in the other of said members converging from a central portion thereof toward a line connecting the intersections of that proximate edge with said short ends of the associated slit, said central portion being spaced from said line by said second distance.

4. In the combination according to claim 3, the sum of said first distance and second distance being about five times as large as said first distance.

5. In the combination according to claim 1, said members comprising coaxial relatively rotatable cylindrical members, the member having said work port means opening into its sealing surface comprising an outer member sleeved over the other of said members, said supply and return ports being spaced circumferentially by the associated work port, and said valve opening direction extending circumferentially.

6. In the combination according to claim 5, said short ends extending circumferentially, said proximate edges of each work port diverging from each other toward central portions of maximum spacing therebetween, and said proximate edges of the supply and return ports associated with each work port being parallel to each other.

7. In the combination according to claim 6, each work port being disposed symmetrically between its associated supply and return ports at said neutral position to provide said supply and return slits of equal areas, each central portion being spaced circumferentially from a line connecting the intersections of the associated proximate edge with the short ends of the associated slit, and the circumferential distance between each central portion and associated line comprising said second distance.

8. In the combination according to claim 7, said short ends comprising the axially spaced ends of said work ports.

9. In the combination according to claim 8, said first distance being less than said second distance.

10. In the combination according to claim 7, the elongated dimension of each slit at the neutral position being more than twenty-five times the sum of said first and second distances.

11. In the combination according to claim 10, the ratio of said first distance to the sum of said first distance and said second distance being about 1:5.

12. In the combination according to claim 7, said outer member comprising an annular wall sleeved over said other member, said work port means comprising two approximately identical work ports at diametrically spaced locations and extending radially through said annular wall, said other member comprising a one piece inner member providing supply and return duct means, two diametrically opposed supply ports and two diametrically opposed return ports in communication respectively with said supply and return duct means, and an outer cylindrical surface comprising one of said sealing surfaces, said outer sealing surface comprising a pair of annular portions spaced axially by said ports in said surface and extending completely around said one surface to provide a pair of circumferentially unbroken sealing lands, each of said supply and return ports comprising in part a separate recess extending axially in said outer sealing surface between said sealing lands and intersecting said supply and return duct means respectively, one edge of each recess intersecting said outer sealing surface along an accurately defined axially extending line comprising the porting edge for the associated port, each supply port comprising in part a separate pressure balancing recess in said outer sealing surface, the pressure balancing recess of each supply port extending axially between said sealing lands and circumferentially in the direction away from the porting edge of that supply port and terminating short of the next adjacent return port to provide an axially extending land portion of said outer sealing surface spacing that supply port from said next adjacent return port.

13. A one-piece valve member for a rotary valve assembly comprising
(A) an outer cylindrical sealing surface,
(B) a pair of circumferentially spaced supply ports extending into said surface,
(C) a pair of circumferentially spaced return ports associated respectively with said supply ports and extending into said surface at locations spaced circumferentially by said supply ports,
  (a) said outer sealing surface comprising a pair of annular land portions spaced axially by said ports and extending unbrokenly around said member,
  (b) each supply port and its associated return port comprising in part a separate recess extending axially between said sealing lands,
  (c) each of the two proximate recesses of the associated supply and return ports having an accurately defined porting edge proximate and extending axially and parallel to the corresponding porting edge of the other proximate recess and spaced circumferentially from said other edge by an intervening portion of said sealing surface,
  (d) each supply port also comprising in part a separate pressure balancing recess extending axially between said sealing lands and circumferentially toward the next adjacent return port associated with the other supply port,
  (e) and each pressure balancing recess terminating short of said next adjacent return port to provide an axially extending land portion of said sealing surface spacing that pressure balancing recess from said next adjacent return port.

14. A valve member as in claim 13 and in addition an outer valve member rotatably sleeved coaxially over said outer sealing surface and having an inner cylindrical sealing surface confronting said outer sealing surface in fluid sealing relationship, and pair of work ports associated respectively with the associated supply and return ports and overlying said intervening portion of said sealing surface spacing said proximate porting edges of the associated supply and return ports, each work port extending axially between said sealing lands and terminating axially in accurately defined circumferentially extending ends each work port also extending circumferentially to overlap the proximate edges of the associated supply and return ports to provide axially elongated supply and return passages when said valve members are at a neutral position with respect to each other, each work port terminating circumferentially in a pair of accurately defined porting edges spacing said ends and associated respectively with the porting edges of the associated supply and return ports to define the long edges of said elongated supply and return passages, said circumferentially extending ends of said work ports defining the short ends of said elongated supply and return passages, said pair of porting edges of each work port diverging from each other toward a central region of maximum circumferential dimension of that work port to effect a gradual closing of one or the other of said supply and return passages upon relative rotation of said members in one direction or the opposite from said neutral position.

15. In a combination according to claim 14, each supply and return passage at the neutral position comprising an axially elongated slit having an axial dimension between said circumferentially extending ends more than approximately twenty-five times its maximum circumferential dimension at said central region.

16. In the combination according to claim 15, the circumferential length of each short end of said elongated passages at said neutral position being approximately ⅕ of said maximum circumferential dimension.

17. In the combination according to claim 14, each supply and return passage at the neutral position comprising an axially elongated slit, and the circumferential length of each short end of said supply and return passages at the neutral position being less than the difference between said maximum circumferential dimension and said length of each short end at said neutral position.

References Cited

UNITED STATES PATENTS

| | | | |
|---|---|---|---|
| 3,291,002 | 12/1966 | Folkerts | 137—625.63 XR |
| 3,359,866 | 12/1967 | Folkerts | 95—375 |
| 3,404,704 | 10/1968 | Adams | 137—625.22 |

HENRY T. KLINKSIEK, Primary Examiner

U.S. Cl. X.R.

137—625.23